United States Patent [19]
Chen et al.

[11] Patent Number: 5,910,907
[45] Date of Patent: Jun. 8, 1999

[54] SHIFT REGISTER BASED PSEUDORANDOM NUMBER GENERATOR

[75] Inventors: Chih-Kang Chen, San Jose; Alan S. Bradley, Alameda, both of Calif.

[73] Assignee: C.K. Chen, Sunnyvale, Calif.

[21] Appl. No.: 08/801,396

[22] Filed: Feb. 20, 1997

[51] Int. Cl.$^6$ ................................. G06F 1/02; H04L 9/00
[52] U.S. Cl. ...................... 364/724.1; 364/717; 364/724; 380/50
[58] Field of Search ............................. 380/50; 364/717, 364/717.01, 717.07, 717.03, 724.1, 717.06, 717.04, 724

[56] References Cited

U.S. PATENT DOCUMENTS

| | | | |
|---|---|---|---|
| 4,965,881 | 10/1990 | Dilley | 380/50 |
| 5,446,683 | 8/1995 | Mullen et al. | 364/717 |
| 5,566,099 | 10/1996 | Shimada | 364/717 |
| 5,574,673 | 11/1996 | Lowy | 364/717 |

OTHER PUBLICATIONS

S.W. Golomb, "Shift Register Sequences", Aegean Park Press, 1982.

Horowitz and Hill, "The Art of Electronics", Cambridge University Press, 2nd Edition, 1989, pp. 655–657.

W.A Gardner and C.K. Chen, "On the Spectrum of Pseudo Noise," IEEE Proceedings, vol. 74, No. 4, pp. 608–309, Apr. 1986.

*Primary Examiner*—Ayaz R. Sheikh
*Assistant Examiner*—Rijue Mai
*Attorney, Agent, or Firm*—Townsend and Townsend and Crew LLP

[57] ABSTRACT

An apparatus for, and method of, generating a k-bit pseudorandom number using m storage devices, m being less than k, is provided. The apparatus has interconnections among the storage devices. The interconnections include modulo-2 adders, and preferably 2-input modulo-2 adders, providing feedback to the storage devices. Some adders have outputs coupled to inputs of the storage devices while others have outputs coupled to k output lines. The interconnections are derived according to an m'th order generating polynomial and arranged to implement the generating function thereby outputting k bits on the k output lines each cycle of a clock signal common to the storage devices.

20 Claims, 2 Drawing Sheets

SHIFT REGISTER BASED PSEUDORANDOM NUMBER GENERATOR

BACKGROUND OF THE INVENTION

The present invention relates to linear feedback shift register pseudorandom number generators. More particularly, the present invention relates to such pseudorandom number generators having a reduced number of storage devices.

Pseudorandom numbers have many desirable properties and enjoy wide use. Due to their randomness, pseudorandom numbers serve as good noise emulators that provide assistance in digital system testing and measurement, data scrambling, coding, cryptography, and signal modulation. An effective way to perform a comprehensive test and verification of a system is to feed the system with a pseudorandom number generator running in real time. In such a setup, the pseudorandom number generator derives its clock signal from the system and outputs a k-bit random sample every clock cycle. Each random sample consists of k concatenated random bits of either 1 or 0. The pseudorandom samples closely resemble white noise which may be used to exercise and check data buses, registers, memory devices, signal processing functions in the system, etc. This approach greatly facilitates system debug and functional verification down to the bit level.

It is therefore desirable to have an inexpensive and effective way of generating pseudorandom numbers.

One apparatus presently used for generating k-bit pseudorandom numbers using k linear feedback shift registers (LFSRs) is described in U.S. Pat. No. 4,965,881 issued to Dilley on Mar. 27, 1990. The Dilley apparatus implements an n'th order generating polynomial using an m-stage LFSR (i.e., m storage devices), where n≠m, that produces a k-bit random word, where k=m, per clock cycle. One particular embodiment in accordance with a $7^{th}$ order generating polynomial $f(x)=1=x^6+x^7$ is shown in FIG. 1. As shown, Dilley's embodiment requires 16 storage devices to produce a 16-bit pseudorandom word per clock cycle. The Dilley apparatus also comprises 17 modulo-2 adders 12 to produce a 16-bit word. Moreover, Dilley presented a method of determining how to couple the storage devices 11 and the modulo-2 adders 12 to output lines 10. The method presented included creating a matrix having dimensions k×k (e.g., 16×16 in FIG. 1) that described the iterative generation of a k-bit pseudorandom word. Storage devices, modulo-2 adders and hardware to perform operations on the matrix all cost money. Therefore the design complexity and cost of a pseudorandom number generator as described by Dilley increases as the size of the word to be produced increases.

A need therefore exists for an apparatus that will provide k-bit pseudorandom words employing fewer than k storage devices, k+1 modulo-2 adders and hardware to accommodate a k×k dimension matrix indicative of how to couple the adders and storage devices to output lines.

SUMMARY OF THE INVENTION

The present invention provides an improved, reduced-cost LFSR pseudorandom number generator employing fewer storage registers than bits in the word produced, and a correspondingly reduced coupling complexity of the storage devices with modulo-2 adders and output lines, and matrix size for determining the appropriate coupling.

An apparatus of the present invention includes an LFSR pseudorandom number generator having fewer storage devices than bits in a pseudorandom word produced. Exactly m storage devices, each having an input and an output that changes in response to a clock signal common to all the storage devices, are coupled to exactly k output lines via a plurality of interconnections. The interconnections provide feedback among the storage devices. Furthermore, the interconnections couple the storage devices such that the LFSR implements an m'th order generating polynomial when the k output lines are serialized to produce a k-bit pseudorandom word where k is greater than m. The interconnections may be a plurality of modulo-2 adders. By using 2-input modulo-2 adders, with m adders having their outputs coupled to m storage devices and k–m adders having their outputs coupled to k–m output lines, with their inputs coupled to output lines appropriately, a reduced number of storage devices and adders may be used, thereby reducing cost and complexity of the apparatus with respect to the prior art.

In another embodiment, the present invention provides a method of generating a k-bit pseudorandom word. The method includes supplying exactly m bits, m being less than k, combining supplied bits to create an additional bit, and using at least one of the m supplied bits and the additional bit to form a k-bit word. Using all of the m bits in the k-bit word provides the most efficient usage of the bits.

A further understanding of the nature and advantages of the inventions herein may be realized by reference to the remaining portions of the specification and the attached drawings.

DESCRIPTION OF SPECIFIC EMBODIMENTS

Figure 1:
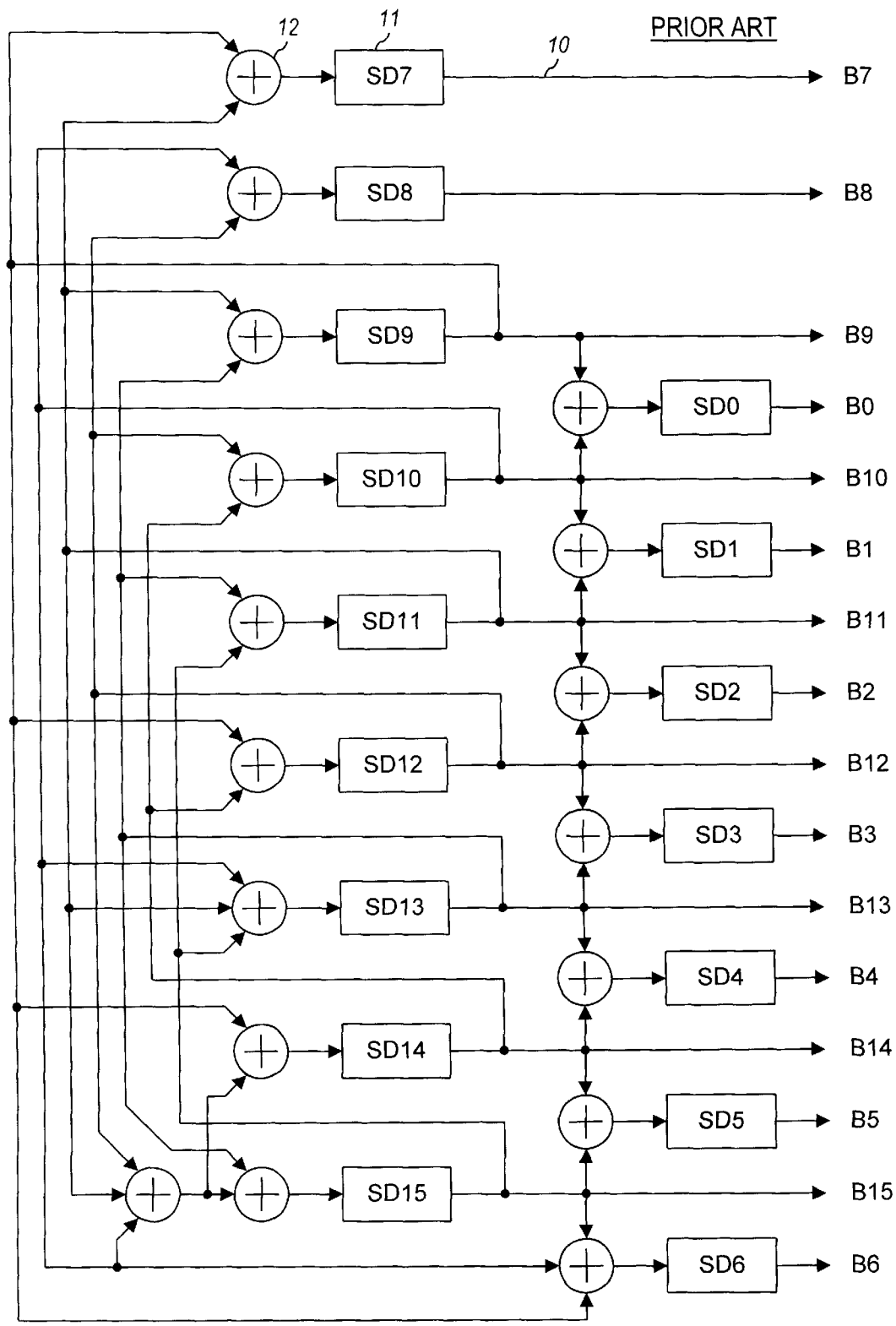
FIG. 1 illustrates a prior art 16-bit pseudorandom number generator employing 16 storage devices and 17 modulo-2 adders.

In one embodiment, a pseudorandom number generator of the present invention provides the ability to produce a k-bit pseudorandom word derived from an n'th order generating polynomial using m storage devices, where m=n and k>m. According to the invention, one may arbitrarily select the number of bits, k, desired in the pseudorandom word for a given order of a polynomial corresponding to the number of storage devices subject only to the limitation that $k<2^n-1$, $2^n-1$ being a period of a pseudorandom bit sequence.

In chapters 2–3 of his book, "Shift Register Sequences" (Aegean Park Press, 1982), S. W. Golomb discussed the theory and properties of LFSR sequences and their construction. The contents of this book are incorporated by reference herein for all purposes. According to Golomb, an m-stage shift register sequence, $\{a_n\}=\{a_0, a_1, a_2, \ldots, \}$, may be associated with a generating function.

$$G(x) = \sum_{r=0}^{\infty} a_r x^r \tag{1}$$

where r represents a sequential number of the pseudorandom number generated (e.g., r=0 corresponds to the first pseudorandom number generated, r=1 corresponds to the second pseudorandom number generated, etc.). An initial state, or seed, of the m-stage register is given by $$a_0, a_1, \ldots, a_{m-1} \tag{2}$$

where each element is either one or zero but not all zeros. If $\{a_n\}$ satisfies the recurrence relation $$a_r = \sum_{i=0}^{m-1} c_i a_{r-i-1} \qquad r = m, m+1, \ldots \qquad (3)$$

where $\{c_0, c_1, \ldots, c_{m-1}\}$, termed feedback coefficients, are either 1's or 0's and the summation is modulo-2 addition, then the generating function can be expressed as $$G(x) = \sum_{r=0}^{m-1} a_r x^r + \sum_{r=m}^{\infty} \sum_{i=0}^{m-1} c_i a_{r-i-1} x^r \qquad (4)$$

or $$G(x) = \sum_{r=0}^{m-1} a_r x^r + \sum_{i=0}^{m-1} c_i x^{i+1} \left[ \sum_{r=0}^{\infty} a_r x^r - \sum_{r=0}^{m-i-2} a_r x^r \right] \qquad (5)$$

Reorganization of equation (5) yields $$G(x) = \frac{\sum_{r=0}^{m-1} a_r x^r - \sum_{i=0}^{m-1} c_i x^{i+1} \sum_{r=0}^{m-i-2} a_r x^r}{1 - \sum_{i=0}^{m-1} c_i x^{i+1}} \qquad (6)$$

Clearly, G(x) depends only on the initial state $\{a_0, a_1, \ldots, a_{m-1}\}$ and feedback coefficients $\{c_0, c_1, \ldots, c_{m-1}\}$. In other words, the entire LFSR sequence $\{a_n\} = \{a_0, a_1, a_2, \ldots\}$ can be expressed in terms of $\{a_0, a_1, \ldots, a_{m-1}\}$ and $\{c_0, c_1, \ldots, c_{m-1}\}$.

A maximum length of an m-stage LFSR sequence is $p=2^m-1$. To achieve maximal length, the m-th order generating polynomial $$f(x) = 1 + \sum_{i=0}^{m-1} c_i x^{i+1} \qquad (7)$$

must be irreducible and prime over the Galois field, regardless the initial state $\{a_0, a_1, \ldots, a_{m-1}\}$, as long as they are not all zeros, yielding the feedback coefficients. For example, for m=7, a simplest generating polynomial for two feedback coefficients is $f(x)=1+x^6+x^7$ (i.e., $C_5=C_6=1$ and $c_0= \ldots =c_4=0$). Algorithms for deriving generating polynomials can be found in chapter 3 of S. W. Golomb, "Shift Register Sequences", and a list of generating polynomials for two feedback coefficients for up to m=39 can be found in Horowitz and Hill, "The Art of Electronics" (Cambridge University Press, 2nd Edition, 1989), pages 655–657, the contents of which are incorporated by reference herein for all purposes.

The recurrence relation for an entire LFSR is most conveniently viewed in matrix form. For an m-stage LFSR, the initial state $\{a_0, a_1, \ldots, a_{m-1}\}$ is viewed as an m-dimensional vector, and feedback coefficients are used to form an m×m transition matrix $$M_T = \begin{bmatrix} c_0 & c_1 & c_2 & \ldots & c_{m-2} & c_{m-1} \\ 1 & 0 & 0 & \ldots & 0 & 0 \\ 0 & 1 & 0 & \ldots & 0 & 0 \\ \ldots & \ldots & \ldots & \ldots & \ldots & \ldots \\ 0 & 0 & 0 & \ldots & 1 & 0 \end{bmatrix} \qquad (8)$$

It follows that the recurrence relation in (3) takes the iteration form $$\begin{bmatrix} a_{m+r} \\ a_{m-1+r} \\ a_{m-2+r} \\ \ldots \\ a_{1+r} \end{bmatrix} = \begin{bmatrix} c_0 & c_1 & c_2 & \ldots & c_{m-2} & c_{m-1} \\ 1 & 0 & 0 & \ldots & 0 & 0 \\ 0 & 1 & 0 & \ldots & 0 & 0 \\ \ldots & \ldots & \ldots & \ldots & \ldots & \ldots \\ 0 & 0 & 0 & \ldots & 1 & 0 \end{bmatrix} \begin{bmatrix} a_{m-1+r} \\ a_{m-2+r} \\ a_{m-3+r} \\ \ldots \\ a_r \end{bmatrix} \qquad (9)$$

$r = 0, 1, \ldots$

Again, the matrix multiplication in equation (9) follows the rules of modulo-2 addition. For m=7, equation (9) becomes $$\begin{bmatrix} a_{7+r} \\ a_{6+r} \\ a_{5+r} \\ a_{4+r} \\ a_{3+r} \\ a_{2+r} \\ a_{1+r} \end{bmatrix} = \begin{bmatrix} 0 & 0 & 0 & 0 & 0 & 1 & 1 \\ 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \end{bmatrix} \begin{bmatrix} a_{6+r} \\ a_{5+r} \\ a_{4+r} \\ a_{3+r} \\ a_{2+r} \\ a_{1+r} \\ a_{0+r} \end{bmatrix} \qquad (10)$$

Equation (6) shows that given the initial state and the feedback coefficients, the entire LFSR sequence is uniquely determined and is instantly available mathematically.

Equation (10) indicates that an iterative method can be devised in which each iteration produces a new element or bit in an m-element vector on the left side of the equation and any two successive vectors share m−1 elements or bits. This iterative relation is most suitable for digital electronic implementation and requires only m storage devices driven by a clock signal. Each iteration occurs when the clock signal completes one cycle. The present invention relates to such implementation and produces more than one new bit every clock cycle.

FIG. 1 illustrates, as discussed above, a presently-known k-bit random word generator using an m-stage LFSR, corresponding to an n'th order generating polynomial, where n≠m and k=m=16. This arrangement requires k storage devices 11 (e.g., flip-flops), labeled SD0 through SD15, to produce a k-bit random word per clock cycle. Additionally, this arrangement requires k+1 modulo-2 adders 12 (e.g., exclusive-OR gates).

The arrangement in FIG. 1 has a drawback in that it requires k storage devices 11 in order to implement an n'th order generating polynomial. For a 16-bit word generator implementing a $7^{th}$ order generating polynomial, the arrangement of FIG. 1 requires 16 storage devices 11. As discussed in relation to equations (1)–(6), however, the initial state $\{a_0, a_1, \ldots, a_{m-1}\}$ and the feedback coefficients $\{c_0, c_1, \ldots, c_{m-1}\}$ uniquely determine an m-stage LFSR sequence corresponding to a n'th order generating polynomial, where n=m. This means that only m=n storage devices 11 are required for storing the m initial bits and, consequently, implementing the entire sequence generation. Indeed, seven storage devices 11 can implement a $7^{th}$ order generating polynomial $f(x)=1+x^6+x^7$, including the feedback coefficients $$\{c_r\}_0^6 = \{0, 0, 0, 0, 0, 1, 1\}$$

and seven initial bits $$\{a_r\}_0^6$$

not all zeros.

The arrangement in FIG. 1 has a second drawback in that the initial bits for the 16 storage devices 11 are not uniquely defined. The initial bits $\{a_0, a_1, \ldots, a_{m-1}\}$ are defined, but the remaining k–m bits are not. U.S. Pat. No. 4,965,881 is silent on how to initialize the k–m bits not included in the initial state bits $\{a_0, a_1, \ldots, a_{m-1}\}$. One alternative is to put arbitrary 1's or 0's in SD0 to SD8 and initial state bits $$\{a_r\}_0^6$$

in SD9 to SD15 in the embodiment in FIG. 1. Consequently, any receiving circuitry must discard the arbitrary k–bits in the first 16-bit word. If these arbitrary bits remain as part of the LSFR sequence, it could have grave consequences on the sequence statistical property. For example, for the $f(x)=1+x^6+x^7$ the LFSR sequence has a period of $p=2^7-1=127$ bits of 1's and 0's and a flat spectrum computed using a Discrete Fourier Transform (DFT). If the sequence, however, is extended with an extra bit to yield a period of 128 bits, then the sequence loses the flat spectrum property. This phenomenon was discussed in a paper by W. A. Gardner and C. K. Chen, "On the Spectrum of Pseudo Noise," IEEE Proceedings, Vol. 74, No. 4, pp. 608–609, April 1986, the contents of which are herein incorporated by reference for all purposes.

Figure 2:
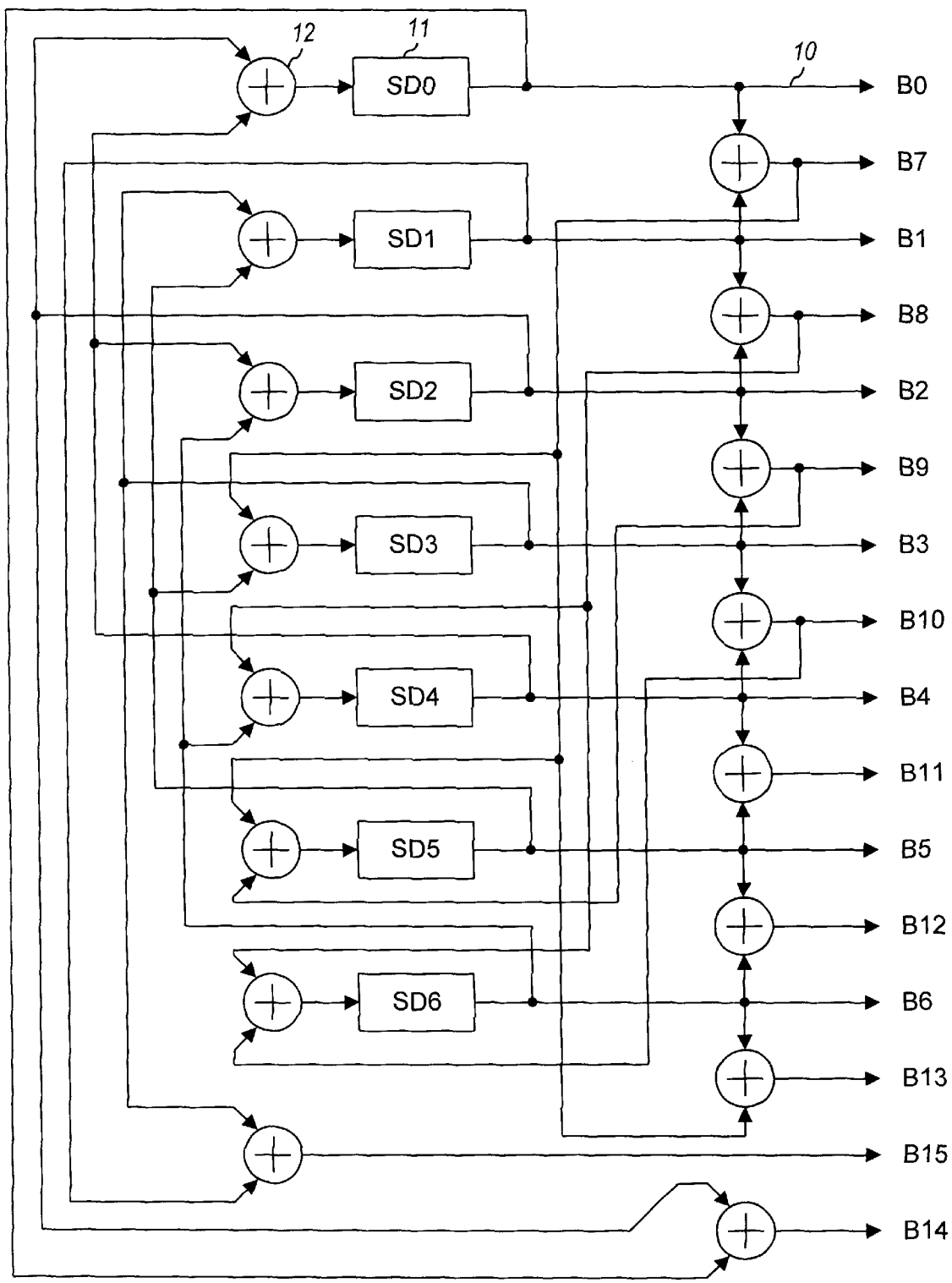
FIG. 2 illustrates an embodiment of the present invention implementing a 16-bit pseudorandom number generator employing 7 storage devices and 16 modulo-2 adders.

FIG. 2 illustrates an embodiment of the present invention that provides a pseudorandom number generator implementing an n'th order generating polynomial using m storage devices 11, where n=m, to produce a k-bit word per clock cycle. Like the apparatus illustrated in FIG. 1, the embodiment in FIG. 2 implements the generating polynomial $f(x)=1+x^6+x^7$ to produce a 16-bit word every clock cycle. Unlike the apparatus illustrated in FIG. 1, however, the embodiment depicted in FIG. 2 requires only m=7 storage devices 11 labelled SD0–SD6 and k=16 2-input modulo-2 adders 12. Additionally, all 16 bits in the first word of the apparatus of FIG. 2 are valid LFSR sequence bits having the same statistical properties as the subsequent words. This eliminates the need for the receiving circuitry to discard any bits of the first word. A common clock signal CLK drives all storage devices 11.

An arrangement for coupling storage devices 11 to modulo-2 adders 12 and output lines 10 derives from construction of a generation matrix $M_G$ which consists of a transition matrix $M_T$ and an expansion matrix $M_E$. The generation matrix $M_G$ of a k-bit pseudorandom word generator that uses an m-stage LFSR and has a size of k×k and is given $$M_G = \begin{bmatrix} 0 & M_E \\ 0 & M_T \end{bmatrix} \quad (11)$$

Upper left 0 matrix is of size (k–m)×(k–m) with all elements equal to zero; lower left 0 matrix is of size m×(k–m) with all elements equal to zero; equation (8) specifies the transition matrix $M_T$; and the expansion matrix $M_E$ has a size of (k–m)×m and satisfies the relationship $$\begin{bmatrix} a_k \\ a_{k-1} \\ \ldots \\ a_{m+2} \\ a_{m+1} \end{bmatrix} = M_E \begin{bmatrix} a_{m-1} \\ a_{m-2} \\ \ldots \\ a_1 \\ a_0 \end{bmatrix} \quad (12)$$

The transition matrix $M_T$ is so labeled because it provides the relationship between the state of the m storage devices 11 from one clock cycle to the next (see equation (16) below). In other words, the transition matrix $M_T$ shows how the current outputs of the m storage devices 11 transition to their respective future outputs as of the next clock cycle.

The expansion matrix $M_E$ is so labeled because it indicates the coupling of the outputs of the m storage devices 11 to form k–m new outputs. In other words, the expansion matrix $M_E$ indicates what coupling to use in order to expand the m outputs to k–1 outputs (with one output indicated by $M_E$ not used) comprising the original m outputs and the k–m–1 additional outputs.

Computation using the recurrence relation in equation (3) yields the expansion matrix $M_E$ that satisfies the relationship in equation (12). A single iteration that produces one new bit in a k-bit word is given by $$\begin{bmatrix} a_{k+r} \\ a_{k-1+r} \\ \ldots \\ a_{2+r} \\ a_{1+r} \end{bmatrix} = M_G \begin{bmatrix} a_{k-1+r} \\ a_{k-2+r} \\ \ldots \\ a_{1+r} \\ a_r \end{bmatrix} \quad r = 0, 1, \ldots \quad (13)$$

A full iteration that produces k new bits in a k-bit word is obtained by applying equation (13) k times as follows $$\begin{bmatrix} a_{2k-1+kr} \\ a_{2k-2+kr} \\ \ldots \\ a_{k+1+kr} \\ a_{k+kr} \end{bmatrix} = (M_G)^k \begin{bmatrix} a_{k-1+kr} \\ a_{k-2+kr} \\ \ldots \\ a_{1+kr} \\ a_{kr} \end{bmatrix} = \begin{bmatrix} 0 & M_E(M_T)^{k-1} \\ 0 & (M_T)^k \end{bmatrix} \begin{bmatrix} a_{k-1+kr} \\ a_{k-2+kr} \\ \ldots \\ a_{1+kr} \\ a_{kr} \end{bmatrix} \quad (14)$$

$$r = 0, 1, \ldots$$

where modulo-2 addition rules apply throughout the matrix multiplication. Expanding equation (14) yields $$\begin{bmatrix} a_{k-1+k(r+1)} \\ a_{k-2+k(r+1)} \\ \ldots \\ a_{m+1+k(r+1)} \\ a_{m+k(r+1)} \end{bmatrix} = M_E(M_T)^{k-1} \begin{bmatrix} a_{k-1+kr} \\ a_{k-2+kr} \\ \ldots \\ a_{m+1+kr} \\ a_{m+kr} \end{bmatrix} \quad r = 0, 1, \ldots \quad (15)$$

and $$\begin{bmatrix} a_{m-1+k(r+1)} \\ a_{m-2+k(r+1)} \\ \ldots \\ a_{1+k(r+1)} \\ a_{k(r+1)} \end{bmatrix} = (M_T)^k \begin{bmatrix} a_{m-1+kr} \\ a_{m-2+kr} \\ \ldots \\ a_{1+kr} \\ a_{kr} \end{bmatrix} \quad r = 0, 1, \ldots \quad (16)$$

Equation (15) fully specifies the upper k–m bits in the next iteration of the k-bit word and, similarly, equation (16) fully specifies the lower m bits. Consequently, the matrix $M_E(M_T)^{k-1}$ specifies the construction of upper k–m output bits and the matrix $(M_T)^k$ specifies the construction of the lower m output bits in the k-bit word using only modulo-2 adders whose outputs are fed to respective inputs of the m storage devices 11.

FIG. 2 illustrates an example of the present invention implementing a $7^{th}$ order polynomial using 7 storage devices 11 and sixteen output lines 10 to produce a 16-bit word. In particular, the embodiment shown in FIG. 2 realizes the polynomial $f(x)=1+x^6+x^7$. Equation (3) specifies the recurrence relation as $$a_{r+7}=a_{r+0}+a_{r+1}=r=0,1,\ldots \quad (17)$$

The expansion matrix $M_E$ from equation (12) for m=7 and k=16 is $$\begin{bmatrix} a_{16} \\ a_{15} \\ a_{14} \\ a_{13} \\ a_{12} \\ a_{11} \\ a_{10} \\ a_9 \\ a_8 \end{bmatrix} = \underbrace{\begin{bmatrix} 0 & 0 & 1 & 0 & 1 & 0 & 0 \\ 0 & 0 & 0 & 1 & 0 & 1 & 0 \\ 0 & 0 & 0 & 0 & 1 & 0 & 1 \\ 1 & 0 & 0 & 0 & 0 & 1 & 1 \\ 1 & 1 & 0 & 0 & 0 & 0 & 0 \\ 0 & 1 & 1 & 0 & 0 & 0 & 0 \\ 0 & 0 & 1 & 1 & 0 & 0 & 0 \\ 0 & 0 & 0 & 1 & 1 & 0 & 0 \\ 0 & 0 & 0 & 0 & 1 & 1 & 0 \end{bmatrix}}_{M_E} \begin{bmatrix} a_6 \\ a_5 \\ a_4 \\ a_3 \\ a_2 \\ a_1 \\ a_0 \end{bmatrix} \quad (18)$$

The transition matrix $M_T$ is provided in equation (10) as $$\begin{bmatrix} a_7 \\ a_6 \\ a_5 \\ a_4 \\ a_3 \\ a_2 \\ a_1 \end{bmatrix} = \underbrace{\begin{bmatrix} 0 & 0 & 0 & 0 & 0 & 1 & 1 \\ 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \end{bmatrix}}_{M_T} \begin{bmatrix} a_6 \\ a_5 \\ a_4 \\ a_3 \\ a_2 \\ a_1 \\ a_0 \end{bmatrix} \quad (19)$$

The first row of the transition matrix $M_T$ in equation (19) (applying matrix multiplication rules) specifies a construction of output B7 shown in FIG. 2, where $\{a_0, a_1, \ldots, a_6\}$ are the initial states residing in and outputting from SD0–SD6 respectively. Consequently, the 1's indicate the corresponding outputs, namely SD0 and SD1 for B7, combined via modulo-2 addition to yield output B7. Accordingly, FIG. 2 shows this connectivity. Similarly, construction of outputs B8–B15 follows from the lower eight rows in $M_E$ in equation (18). If one desires to use only 2-input modulo-2 adders, then some computations will be required when a matrix row indicates a combination requiring addition of more than two outputs. For example, the expansion matrix $M_E$ indicates adding outputs B0, B1 and B6 to yield output B13. Examination of the outputs reveals that an alternative construction of output B13 results from adding outputs B6 and B7. In this way, the embodiment may be implemented using only 2-input modulo-2 adders.

The transition matrix $M_T$ raised to the power of k=16 specifies the input to the storage devices 11. Substituting into equation (16), with r=0, yields $$\begin{bmatrix} a_{22} \\ a_{21} \\ a_{20} \\ a_{19} \\ a_{18} \\ a_{17} \\ a_{16} \end{bmatrix} = \underbrace{\begin{bmatrix} 0 & 0 & 1 & 1 & 1 & 1 & 0 \\ 0 & 0 & 0 & 1 & 1 & 1 & 1 \\ 1 & 0 & 0 & 0 & 1 & 1 & 0 \\ 0 & 1 & 0 & 0 & 0 & 1 & 1 \\ 1 & 0 & 1 & 0 & 0 & 0 & 0 \\ 0 & 1 & 0 & 1 & 0 & 0 & 0 \\ 0 & 0 & 1 & 0 & 1 & 0 & 0 \end{bmatrix}}_{(M_T)^k} \begin{bmatrix} a_6 \\ a_5 \\ a_4 \\ a_3 \\ a_2 \\ a_1 \\ a_0 \end{bmatrix} = \quad (20A)$$

$$\begin{bmatrix} 0 & 0 & 1 & 1 & 1 & 1 & 0 \\ 0 & 0 & 0 & 1 & 1 & 1 & 1 \\ 1 & 0 & 0 & 0 & 1 & 1 & 0 \\ 0 & 1 & 0 & 0 & 0 & 1 & 1 \\ 1 & 0 & 1 & 0 & 0 & 0 & 0 \\ 0 & 1 & 0 & 1 & 0 & 0 & 0 \\ 0 & 0 & 1 & 0 & 1 & 0 & 0 \end{bmatrix} \begin{bmatrix} SD6\ \text{output} \\ SD5\ \text{output} \\ SD4\ \text{output} \\ SD3\ \text{output} \\ SD2\ \text{output} \\ SD1\ \text{output} \\ SD0\ \text{output} \end{bmatrix} = \begin{bmatrix} SD6\ \text{input} \\ SD5\ \text{input} \\ SD4\ \text{input} \\ SD3\ \text{input} \\ SD2\ \text{input} \\ SD1\ \text{input} \\ SD0\ \text{input} \end{bmatrix} \quad (20B)$$

Equations (20A) and (20B) indicates that, for example, the input of SD0 is feedback from B2 and B4 which carry the initial bits $a_2$ and $a_4$ respectively, through a 2-input modulo-2 adder 12. Again, for storage devices 11 that require more than two feedback inputs, simplification to two inputs is possible. For instance, the inputs to SD6 consist of B1, B2, B3 and B4 but may be simplified to B8 and B9 in order to use a single 2-input modulo-2 adder 12. FIG. 2 shows all the appropriate connectivities dictated by equations (18)–(20).

Applying equation (14) with m=7 and k=16 yields the 16-bit word generating matrix $M_G$ $$(M_G)^{16} = \begin{bmatrix} 0 & 0 & 0 & 0 & 0 & 0 & 0 & 0 & 0 & 0 & 0 & 1 & 0 & 1 & 1 \\ 0 & 0 & 0 & 0 & 0 & 0 & 0 & 0 & 1 & 0 & 0 & 0 & 1 & 0 & 0 \\ 0 & 0 & 0 & 0 & 0 & 0 & 0 & 0 & 0 & 1 & 0 & 0 & 0 & 1 & 0 \\ 0 & 0 & 0 & 0 & 0 & 0 & 0 & 0 & 0 & 0 & 1 & 0 & 0 & 0 & 1 \\ 0 & 0 & 0 & 0 & 0 & 0 & 0 & 0 & 1 & 0 & 0 & 1 & 0 & 0 & 1 \\ 0 & 0 & 0 & 0 & 0 & 0 & 0 & 0 & 1 & 1 & 0 & 0 & 1 & 0 & 1 \\ 0 & 0 & 0 & 0 & 0 & 0 & 0 & 0 & 1 & 1 & 1 & 0 & 0 & 1 & 1 \\ 0 & 0 & 0 & 0 & 0 & 0 & 0 & 0 & 1 & 1 & 1 & 1 & 0 & 0 & 0 \\ 0 & 0 & 0 & 0 & 0 & 0 & 0 & 0 & 1 & 1 & 1 & 1 & 1 & 0 & 0 \\ 0 & 0 & 0 & 0 & 0 & 0 & 0 & 0 & 0 & 1 & 1 & 1 & 1 & 1 & 0 \\ 0 & 0 & 0 & 0 & 0 & 0 & 0 & 0 & 0 & 0 & 1 & 1 & 1 & 1 & 1 \\ 0 & 0 & 0 & 0 & 0 & 0 & 0 & 1 & 0 & 0 & 0 & 1 & 1 & 0 \\ 0 & 0 & 0 & 0 & 0 & 0 & 0 & 1 & 0 & 0 & 0 & 1 & 1 \\ 0 & 0 & 0 & 0 & 0 & 0 & 1 & 0 & 1 & 0 & 0 & 0 & 0 \\ 0 & 0 & 0 & 0 & 0 & 0 & 0 & 1 & 0 & 1 & 0 & 0 & 0 \\ 0 & 0 & 0 & 0 & 0 & 0 & 0 & 0 & 1 & 0 & 1 & 0 & 0 \end{bmatrix} \quad (21)$$

While the description above provides a full and complete disclosure of the preferred embodiments of the present invention, various combinations, alternative constructions, and equivalents will be obvious to those with skill in the art. Thus, the scope of the present invention is limited solely by the appended claims and their full scope of equivalents.

What is claimed is:

1. A pseudorandom number generator comprising:
   a linear feedback shift register comprising exactly m storage devices, said m storage devices each having an input and an output, each output changing responsive to a clock signal common to said m storage devices, said linear feedback shift register implementing an m'th order generating polynomial;

exactly k output lines of said linear feedback shift register, k being greater than m;

interconnections among said exactly m storage devices of said linear feedback shift register so that said linear feedback shift register implements said m'th order generating polynomial, and further among said m storage devices and said exactly k output lines; and wherein said linear feedback shift register outputs exactly k bits on said exactly k output lines according to said m'th order generating polynomial synchronously with said clock signal.

2. The pseudorandom number generator of claim 1 wherein said interconnections comprise a plurality of modulo-2 adders.

3. The pseudorandom number generator of claim 1 wherein said plurality of modulo-2 adders comprise:

m modulo-2 adders having their outputs coupled to inputs of said m storage devices; and k−m modulo-2 adders having their outputs coupled to k−m of said k output lines.

4. The pseudorandom number generator of claim 1 wherein m of said output lines ($B_0$ through $B_{m-1}$) are coupled to outputs of said m storage devices.

5. The pseudorandom number generator of claim 4 wherein inputs of said m storage devices ($SDI_0$ through $SDI_{m-1}$) are derived from outputs ($SDO_0$ through $SDO_{m-1}$) of said m storage devices according to:

$$\begin{bmatrix} SDI_{m-1} \\ . \\ . \\ . \\ . \\ . \\ SDI_0 \end{bmatrix} = (M_T)^k \begin{bmatrix} SDO_{m-1} \\ . \\ . \\ . \\ . \\ . \\ SDO_0 \end{bmatrix}$$

wherein $M^T$ has dimensions m×m and is substantially equal to $$M_T = \begin{bmatrix} c_0 & c_1 & c_2 & \cdots & c_{m-2} & c_{m-1} \\ 1 & 0 & 0 & \cdots & 0 & 0 \\ 0 & 1 & 0 & \cdots & 0 & 0 \\ \cdots & \cdots & \cdots & \cdots & \cdots & \cdots \\ 0 & 0 & 0 & \cdots & 1 & 0 \end{bmatrix} \quad (8)$$

wherein $c_0$ through $c_{m-1}$ represent coefficients of said m'th order generating polynomial, and computation of said inputs is in accordance with modulo-2 arithmetic.

6. The pseudorandom number generator of claim 5 wherein a remaining k−m outputs of said output lines ($B_m$ through $B_{k-1}$) are derived from outputs ($SD0_0$ through $SDO_{m-1}$) of said m storage devices by the equation:

$$\begin{bmatrix} B_{k-1} \\ . \\ . \\ . \\ B_m \end{bmatrix} = \begin{bmatrix} M_{E(k-m-1)} \\ C_i \end{bmatrix} \begin{bmatrix} SDO_{m-1} \\ . \\ . \\ . \\ SDO_0 \end{bmatrix}$$

wherein $M_{E(k-m-3)}$ is a (k−m−1)×m matrix specified by said m'th order generating polynomial and $C^1$ is a 1×m matrix comprising the coefficients $c_0$ through $c_{m-1}$.

7. The pseudorandom number generator of claim 6 wherein said m'th order generating polynomial is $f(x)=1+x^6+x^7$.

8. The pseudorandom number generator of claim 7 wherein m=7, k=16, $$M_{E(k-m-1)} = \begin{bmatrix} 0 & 0 & 0 & 1 & 0 & 1 & 0 \\ 0 & 0 & 0 & 0 & 1 & 0 & 1 \\ 1 & 0 & 0 & 0 & 0 & 1 & 1 \\ 1 & 1 & 0 & 0 & 0 & 0 & 0 \\ 0 & 1 & 1 & 0 & 0 & 0 & 0 \\ 0 & 0 & 1 & 1 & 0 & 0 & 0 \\ 0 & 0 & 0 & 1 & 1 & 0 & 0 \\ 0 & 0 & 0 & 0 & 1 & 1 & 0 \end{bmatrix}$$

and $$M_T = \begin{bmatrix} 0 & 0 & 0 & 0 & 0 & 1 & 1 \\ 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \end{bmatrix}$$

9. A linear feedback shift register pseudorandom number generator comprising:

exactly m storage devices each having an input and an output, said output changing responsive to a clock signal common to said m storage devices;

exactly k output lines, k being greater than m, said m storage devices outputting exactly k bits on said k output lines, m of said k output lines coupled to outputs of said m storage devices;

m modulo-2 adders each having an output coupled to one of said inputs of said m storage devices;

k-m modulo-2 adders each having an output coupled to one of said k output lines;

wherein said outputs of said m storage devices couple to inputs of said modulo-2 adders such that exactly k bits are output on said k output lines synchronously with said clock signal according to an m'th order generating polynomial.

10. A method for generating a k-bit pseudorandom word, said method comprising the steps of:

supplying exactly m bits, m being less than k;

combining a plurality of said m bits to create at least one additional bit; and forming said k-bit word from at least one of said m bits and said at least one additional bit in accordance with a generating function.

11. The method of claim 10 wherein said generating function is an m'th order polynomial.

12. The method of claim 11 wherein said m bits are combined, to create k−m additional bits, $B_m$ through $B_{k-1}$, derived from said m bits, $SDO_0$ through $SDO_{m-1}$, according to an expansion equation $$\begin{bmatrix} B_{k-1} \\ . \\ . \\ . \\ B_m \end{bmatrix} = \begin{bmatrix} M_{E(k-m-1)} \\ C_i \end{bmatrix} \begin{bmatrix} SDO_{m-1} \\ . \\ . \\ . \\ SDO_0 \end{bmatrix}$$

wherein $C_i$ is a 1×m matrix comprising coefficients $c_0$, $c_1$, ..., $C_{m-1}$ of said generating function, $M^{E(k-m-1)}$ comprises a (k-m-1)xm matrix specified by said generating function, and wherein calculation of said expansion equation is in accordance with modulo-2 addition.

13. The method of claim 10 wherein all of said m bits are used in forming said k-bit word.

14. The method of claim 10 wherein said at least one additional bit is created by combining all of said m bits.

15. The method of claim 10 wherein said plurality of m bits are combined according to modulo-2 addition to form said at least one additional bit.

16. The method of claim 10 wherein said step of supplying exactly m bits further comprises:

initializing m storage devices with m initial bits, at least one of said initial bits not equalling zero; and combining said initial bits to create m new bits such that said m new bits are created each cycle of a clock common to said m storage devices.

17. The method of claim 16 wherein said generating function is an m'th order polynomial and said m storage devices receive inputs $SDI_0$ through $SDI_{m-1}$ derived from outputs $SDO_0$ through $SDO_{m-1}$ of said m storage devices according to a transition equation $$\begin{bmatrix} SDI_{m-1} \\ \cdot \\ \cdot \\ \cdot \\ \cdot \\ \cdot \\ SDI_0 \end{bmatrix} = (M_T)^k \begin{bmatrix} SDO_{m-1} \\ \cdot \\ \cdot \\ \cdot \\ \cdot \\ \cdot \\ SDO_0 \end{bmatrix}$$

wherein $M_T$ is an mxm matrix substantially equal to $$M_T = \begin{bmatrix} c_0 & c_1 & c_2 & \ldots & c_{m-2} & c_{m-1} \\ 1 & 0 & 0 & \ldots & 0 & 0 \\ 0 & 1 & 0 & \ldots & 0 & 0 \\ \ldots & \ldots & \ldots & \ldots & \ldots & \ldots \\ 0 & 0 & 0 & \ldots & 1 & 0 \end{bmatrix} \quad (8)$$

wherein $c_0$ through $c_{m-1}$ represent coefficients of said generating function and computation of said transition equation is in accordance with modulo-2 addition.

18. A pseudorandom number generator comprising:

m storage devices to implement an m'th order generating polynomial, each of said m storage devices having an input and an output, each output changing responsive to a clock signal common to said m storage devices;

k output lines to provide k bits in parallel, k being greater than m; and interconnections among said m storage devices to implement said m'th order generating polynomial, and further among said m storage devices and said k output lines based on a generator function.

19. The generator of claim 18 wherein said interconnections comprise a plurality of modulo-2 adders.

20. The generator of claim 18 wherein m output lines are provided by said m storage devices and k-m output lines are provided by combination of outputs from said m storage devices in accordance with said generator function.

\* \* \* \* \*